US 7,801,966 B2

(12) United States Patent
Dionne et al.

(10) Patent No.: US 7,801,966 B2
(45) Date of Patent: *Sep. 21, 2010

(54) OBJECT DUPLICATION

(75) Inventors: Carl Dionne, Quebec (CA); Martin Lavoie, Longueuil (CA)

(73) Assignee: Quazal Technologies Inc., Montreal, Quebec (CA)

( * ) Notice: Subject to any disclaimer, the term of this patent is extended or adjusted under 35 U.S.C. 154(b) by 786 days.

This patent is subject to a terminal disclaimer.

(21) Appl. No.: 09/735,925

(22) Filed: Dec. 14, 2000

(65) Prior Publication Data

US 2002/0049827 A1 Apr. 25, 2002

(30) Foreign Application Priority Data

Oct. 25, 2000 (GB) .................................. 0026095.0

(51) Int. Cl.
*G06F 15/16* (2006.01)
(52) U.S. Cl. ..................................................... 709/217
(58) Field of Classification Search ................ 709/223, 709/219, 210, 217, 208, 226, 209, 227; 707/203, 707/8; 719/315; 717/117; 714/2, 38; 710/110
See application file for complete search history.

(56) References Cited

U.S. PATENT DOCUMENTS

| 5,307,490 | A | * | 4/1994 | Davidson et al. ............. 719/328 |
| 5,410,688 | A | * | 4/1995 | Williams et al. .............. 707/10 |
| 5,583,983 | A | * | 12/1996 | Schmitter ..................... 717/138 |
| 5,613,079 | A | * | 3/1997 | Debique et al. .............. 711/141 |
| 5,772,512 | A |   | 6/1998 | Chichester |
| 5,781,908 | A | * | 7/1998 | Williams et al. ............. 709/223 |
| 5,784,560 | A | * | 7/1998 | Kingdon et al. ............. 709/201 |
| 5,806,075 | A |   | 9/1998 | Jain et al. |
| 5,838,909 | A |   | 11/1998 | Roy et al. |
| 5,879,236 | A |   | 3/1999 | Lambright |
| 6,067,551 | A | * | 5/2000 | Brown et al. ................. 707/203 |
| 6,112,315 | A | * | 8/2000 | Kuruvila et al. ............... 714/38 |
| 6,199,111 | B1 | * | 3/2001 | Hara et al. ................... 709/227 |

(Continued)

FOREIGN PATENT DOCUMENTS

EP  0981089 A2  2/2000

(Continued)

OTHER PUBLICATIONS

Craymer et al, "A Scalable, RTI-Compatible Interest Manager for Parallel Processors" in Proceedings of the 1997 Spring Simulation Interoperability Workshop, 1997, 97S-SIW-154.

(Continued)

*Primary Examiner*—William C Vaughn, Jr.
*Assistant Examiner*—Farrukh Hussain
(74) *Attorney, Agent, or Firm*—Nixon & Vanderhye PC

(57) ABSTRACT

Data is shared over a network which has a plurality of network connected terminals, each including memory and a processor. The memory includes instruction for managing object duplication, wherein in response to a data requirement of a first of the network terminals, a second of the network terminals duplicates the object at the first terminal. Data is accessed is the using locally executed object instructions at the first terminal. Data consistency is maintained between duplicated objects. said the duplicate objects include a duplicate master and duplicates and, performing a load balancing task or in the case of a network connectivity failure, the respective state thereof may be switched.

20 Claims, 14 Drawing Sheets

U.S. PATENT DOCUMENTS 6,324,571 B1 * 11/2001 Hacherl ....................... 709/208
6,742,023 B1 * 5/2004 Fanning et al. .............. 709/219

FOREIGN PATENT DOCUMENTS

| WO | WO 01/01249 A1 | 1/2001 |
| WO | WO 01/06365 A2 | 1/2001 |
| WO | WO 01/16748 A1 | 3/2001 |
| WO | WO 02/21275 A1 | 3/2002 |

OTHER PUBLICATIONS van Hook et al, "Approaches to Relevance Filtering", in Eleventh Workshop on Standards for the Interoperability of Distributed Simulations, 1994.

van Hook et al, "Approaches to TRI Implementation of HLA Data Distribution Management Services", in Proceedings of the 15$^{th}$ Workshop on Standards for the Interoperability of Distributed Simulations, 1996.

Petty et al, "Experimental Comparison of d-Rectangle Intersection Algorithms Applied to HLA Data Distribution", in Proceedings of the 1997 Fall Simulation Interoperability Workshop, 1997, 97F-SIW-016.

Singhal, Effective Remote Modeling in Large-Scale Distributed Simulation and Visualization Environments, PhD Thesis, Stanford University, 1996.

Singhal et al, "Using a Position History-Based Protocol for Distributed Object Visualization", in Designing Real-Time Graphics for Entertainment [Course Notes for SIGGRAPH '94 Course No. 14], Jul. 1994.

Singhal et al, "Networked Virtual Environments—Design and Implementation", ACM Press Books, SIGGRAPH Series, Jul. 1999.

* cited by examiner

US 7,801,966 B2

OBJECT DUPLICATION

BACKGROUND OF THE INVENTION

1. Field of the Invention

The present invention relates to a method of sharing data over a network, having a plurality of network connected terminals, each comprising memory means and processing means, said memory means including instructions for managing object duplication.

2. Description of the Related Art

Data sharing applications for the distribution of and access to said data over LAN-type networks (Local Area Network) and, more recently, the Internet have been widely developed. Indeed, the very idea of networks is for networked users to be able to exchange data other than via external medium, for instance floppy disks. In a typical situation, a user accesses data located on a server, itself located either on a LAN or on the Internet, and locally peruses said data, which is shared over said LAN or the Internet by other users, be it for recreational or for professional use. However, this approach is invariably based on a method of sharing data over a network according to instructions for managing data or object distribution. In essence, a user accesses data which is not local, peruses said data locally, but said data or object remains located remotely. As a result, should the networked server or network computer become unavailable over said network, for instance if it experiences a malfunction and crashes, said data becomes immediately unavailable and the user looses any information or subsequent modifications to said data.

Sharing data over a network thus suffers from an inherent instability that may result in lost or corrupted data and information. The present state-of-the-art in data sharing over networks does not remedy this inherent instability other than by resorting to backing-up said data and, should a malfunction corrupt or erase said data, subsequently restoring said data from said last known validated back-up. This last action usually requires manual or automated instructions, knowing that said automated instructions also have to be initially manually set-up.

BRIEF SUMMARY OF THE INVENTION

According to a first aspect of the present invention there is provided a method of sharing data over a network, having a plurality of network connected terminals, each comprising memory means and processing means, said memory means including instructions for managing object duplication, wherein in response to a said data requirement of a first of said network terminals, a second of said network terminals duplicates said an object at said first terminal; data is accessed in said object using locally executed object instructions at said first terminal; and data consistency is maintained between duplicated objects.

According to a second aspect of the present invention, there is provided a method of sharing data over a network, having a plurality of network connected terminals, each comprising memory means and processing means, said memory means including instructions for managing object duplication, wherein in response to an availability of a list of said network terminals, an object is duplicated from a second of said network terminals at said first terminal; data access is facilitated using locally executable object instructions at said first terminal; and data consistency is maintained between duplicated objects.

BEST MODE FOR CARRYING OUT THE INVENTION

The invention will now be described by way of example only with reference to the previously identified drawings.

Figure 1:
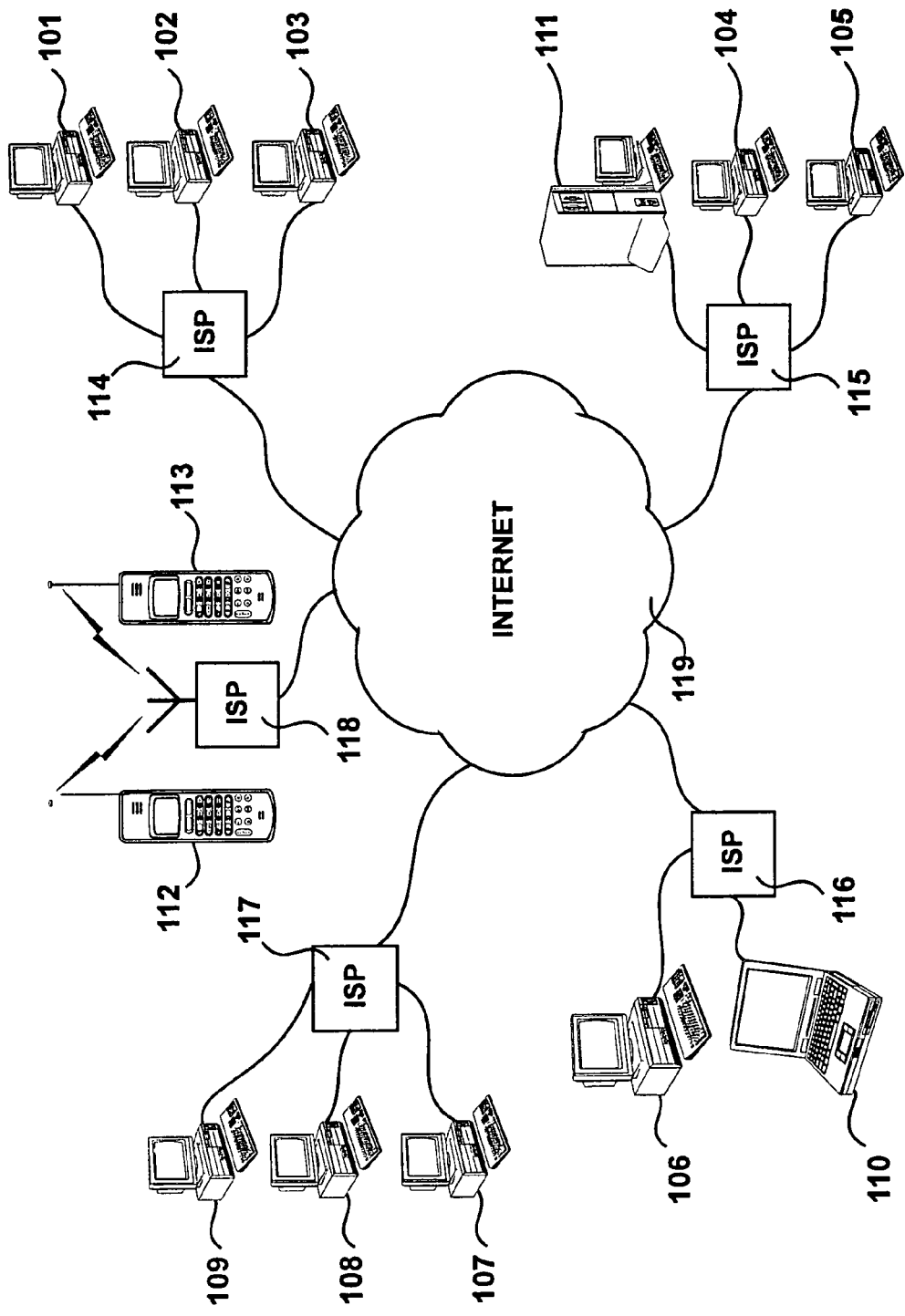
FIG. 1 illustrates a network environment, including user terminals, cell phones and servers sharing data over said network environment.

Data sharing applications distribute said data amongst multiple users using a network of connected computers. An environment for connecting multiple users to whom data will be distributed is illustrated in FIG. 1. Computer terminals 101, 102, 103, 104, 105, 106, 107, 108, 109 and 110, server 111, internet-enabled mobile phones 112 and 113 are connected via internet service providers (ISP) 114, 115, 116, 117 and 118, to the Internet 119. The ISP's 114 to 118 in combination with user terminals 101 to 111, provide each individual user with a unique IP address, e-mail account and other optional internet facilities such as are commonly provided to a user with an ISP account. Provided that appropriate data transfer applications, protocols and permissions have been set up, there is provided the scope for any which one of user terminals 101 to 110 to access data stored on server 111.

Figure 2:
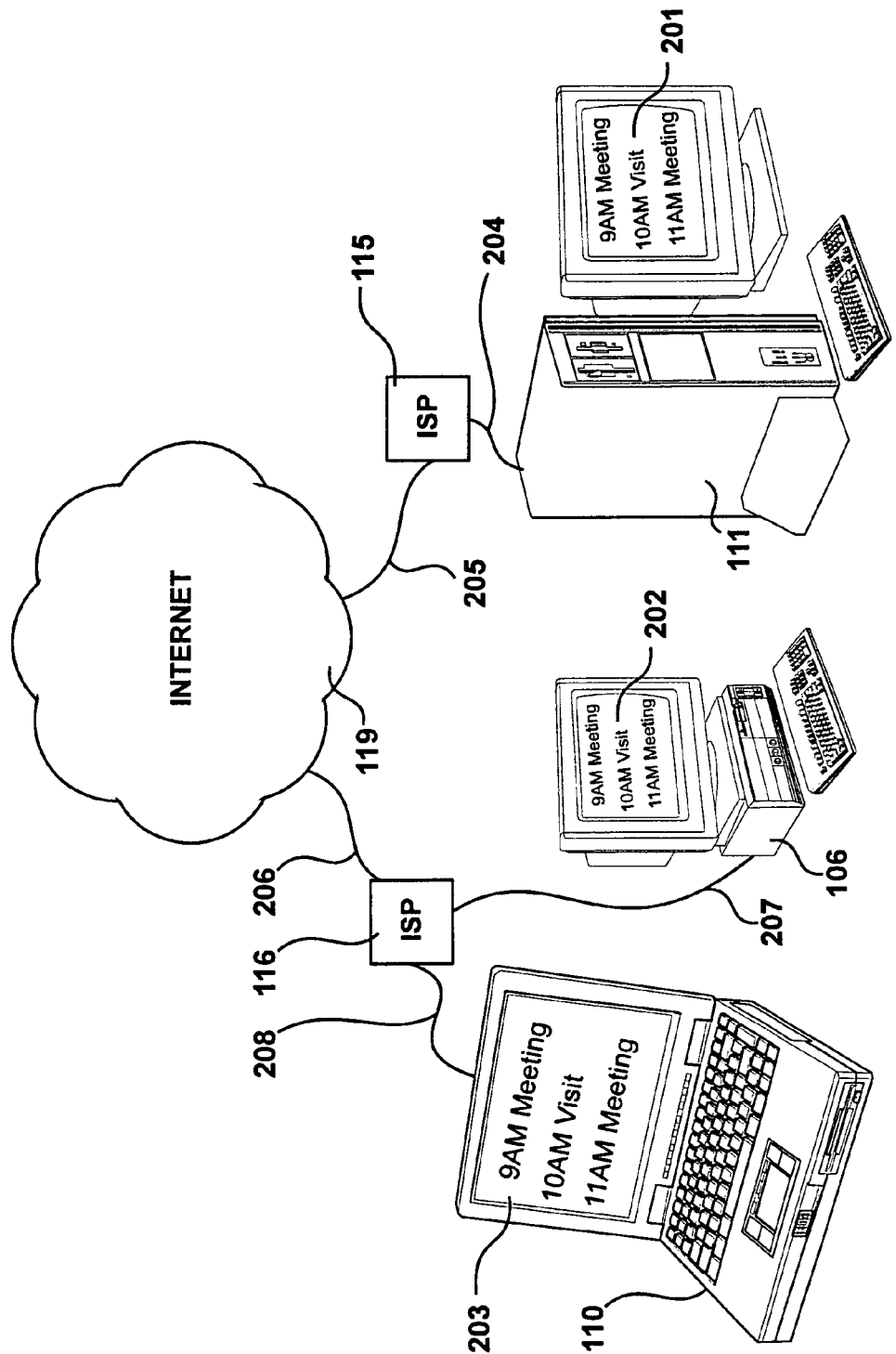
FIG. 2 illustrates a detail of a network environment, wherein identical data is shared between three different terminals.

In the example, user terminals 106 and 110 are connected to the Internet via ISP 116. Upon performing requests to access data stored on server 111, said requests from user terminals 106 and 110 transits via ISP 116 to ISP 115, which in turns transmits said requests to server 111. Provided operators of user terminals 106 and 110 are allowed to access data stored on server 111, server 111 will grant user terminals 106 and 110 access to its stored data. Sharing stored data is illustrated in FIG. 2. Upon meeting all criteria for the successful establishment of a situation of sharing data, both user terminals 106, 110 and the server 111 display identical data in a diary application.

According to the Prior Art, whereas display means 201 of server 111 displays diary information which is stored locally, display means 202 of user terminal 106 and both display means 203 of user terminal 110 display diary information which is stored remotely from them. Therefore, the diary information displayed by display means 202 and 203 is reliant upon server 111 being regularly updated with fresh new diary information and user terminals 106 and 110 performing regular requests for updates of said diary information. Thus, were server 111 to be disabled, whether due to foreseen circumstances such as regular maintenance or unforeseen circumstances such as a hardware fault, then regular requests for data updates, i.e. new diary information, from user terminals 106 and 110 would be unsuccessful and the diary information displayed on display means 202 and 203 would cease to be refreshed.

Moreover, whereas said server 111 may be kept operational at all times, connecting means 204 to 208, or ISP 115 or 116 to become disabled due to foreseen or unforeseen circumstances, then said diary information would equally cease to be updated. In the case of server 111 having been temporarily disabled, upon re-establishing network connection with terminals 106 and 110, the information displayed on display means 202 and 203 would revert back to the last known validated data back-up located on server 111, irrespective of any modifications to the diary information that may have been implemented on user terminal 106 or 110 whilst server 111 was disabled.

The present invention overcomes the above shortcomings in that it prescribes a method of sharing data over a network, having a plurality of network connected terminals, each comprising memory means and processing means, said memory means including instructions for managing object duplication, wherein in response to a data requirement of a first of said network terminals, an object is duplicated from a second of said network terminals at said first terminal and data is then accessed in said object using locally executed object instructions at said first terminal; a data consistency is maintained between duplicated object.

Therefore, according to the invention, diary information stored on server 111 is duplicated onto user terminals 106 and 110 as opposed to merely distributed, such that should server 111 become unavailable, diary information is now stored locally on each of user terminals 106 and 110.

Figure 3:
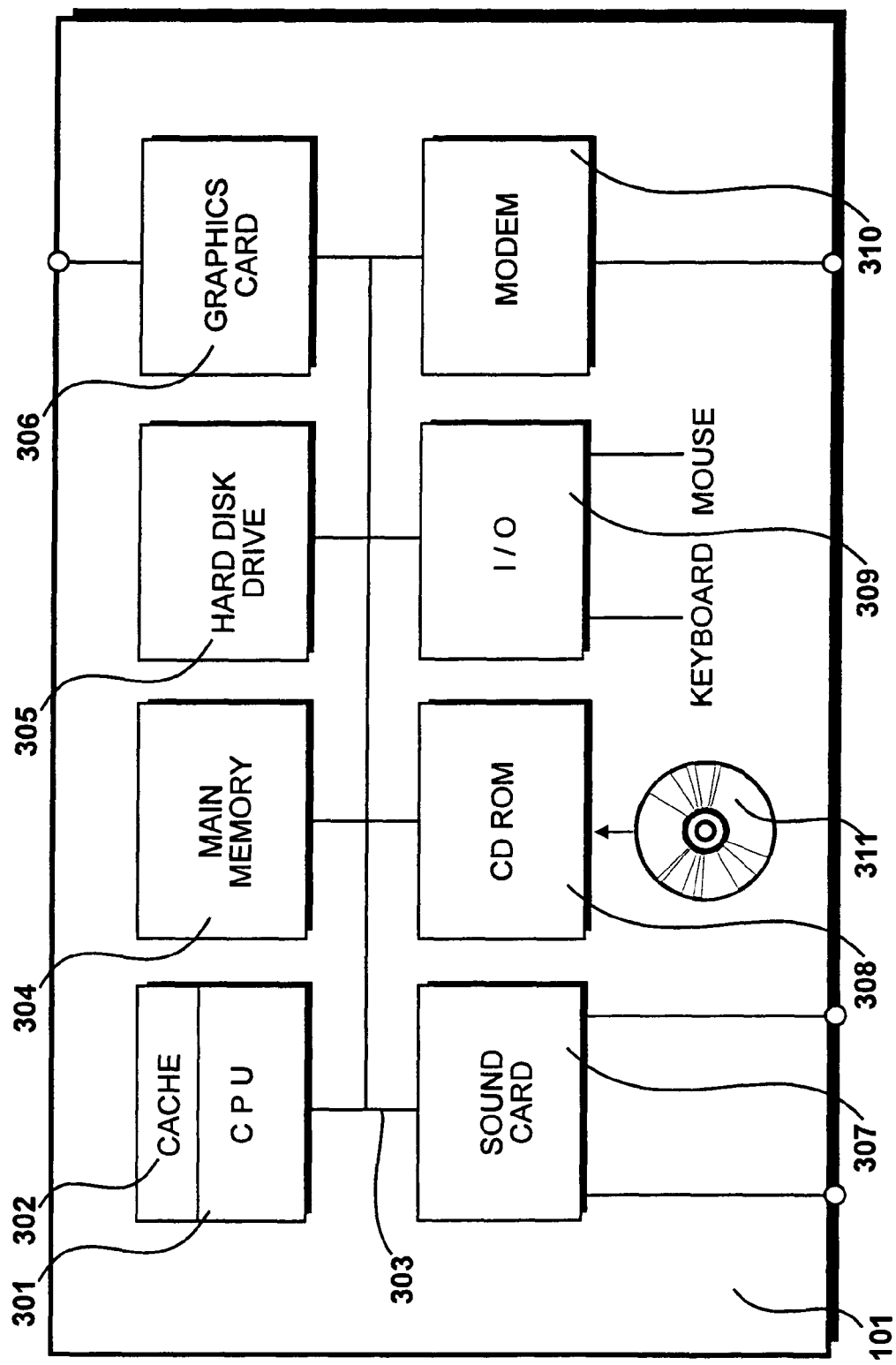
FIG. 3 details hardware components of a user terminal of the type illustrated in FIGS. 1 and 2, including a memory.

Hardware forming the main part of a user's computer terminal 106 is illustrated in FIG. 3. A central processing unit 301 fetches and executes instructions and manipulates data. Frequently accessed instructions and data are stored in a high speed cache memory 302. The central processing unit 301 is connected to a system bus 303. This provides connectivity with a larger main memory 304, which requires significantly more time to access than the cache 302. The main memory 304 contains between sixty-four and one hundred and twenty-eight megabytes of dynamic random access memory. A hard disc drive (HDD) 305 provides non-volatile bulk storage of instructions and data. A graphics card 306 receives graphics data from the CPU 301, along with graphics instructions. Preferably, the graphics card 306 includes substantial dedicated graphical processing capabilities, so that the CPU 301 is not burdened with computationally intensive tasks for which it is not optimised. Similarly, a sound card 307 receives sound data from the CPU 301, along with sound processing instructions.

Preferably, the sound card 307 includes substantial dedicated digital sound processing capabilities, so that the CPU 301 is not burdened with computationally intensive tasks for which it is not optimised. A CD-ROM reader 308 receives processing instructions and data from an external CD-ROM medium 311. A serial bus interface 309 provides connectivity to peripherals such as a mouse and keyboard. A modem 310 provides connectivity to the Internet via a telephone connection to the user's ISP 116. The equipment shown in FIG. 3 constitutes a personal computer of fairly standard type, such as a PC or Mac, whether used as a network terminal or as a network server.

Figure 4:
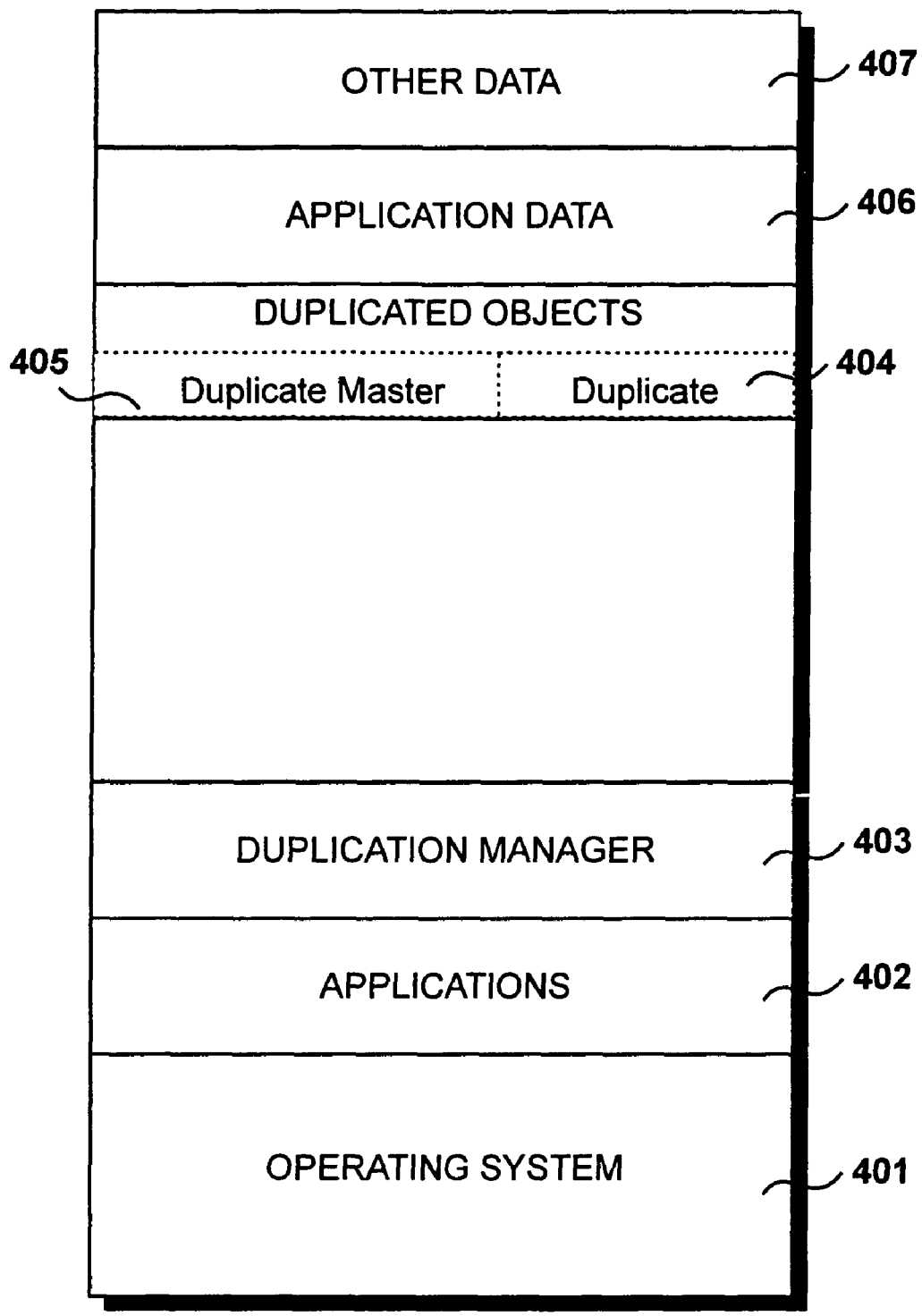
FIG. 4 details the contents of the memory shown in FIG. 3, including a duplication manager and duplicated objects.

The contents of the memory 304 of the user's personal computer 106 shown in FIG. 3 are summarised in FIG. 4. An operating system, including a basic BIOS is shown at 401. This provides common functionality shared between all applications operating on the computer 106, such as disk drive access, file handling and window-based graphical user interfacing. Applications 402 include instructions for an Internet browser, a file browser and other items, that are usually present but inactive on the user's graphical desktop.

Duplication manager instructions 403 comprise the program steps required by the CPU 301 to act upon duplicated objects, the type of which comprise either a duplicate 404 or duplicate master 405.

The Duplication Manager is responsible for allocating the portion of main memory necessary to the successful establishment of duplicated objects and for servicing said duplicated objects throughout their life-cycle. The Duplication Manager 403 also monitors the machines from which it receives data from remote duplicate masters using keep-alive procedures. For instance, in the case of a communication failure, the duplication manager ensures that only one duplicate will take over the responsibility of duplicate master. Similarly, in the case of a new user terminal connecting to the network, the Duplication Manager detects said connection and inform the Duplicate Master 405 to take appropriate subsequent action.

Finally, outside the context of a fault-induced triggering event as described above, the load-balancing task of the Duplication Manager can also be performed automatically, the result of which is also to switch the state of a duplicate to the state of duplicate master and toggle the state of the previous duplicate master to the state of duplicate.

The Duplicated objects can be either Duplicate 404 or Duplicate Master 405. They provide object duplication functionality and include dynamic elements, such as attributes and methods, with methods performing attributes processing. Duplicated objects have the ability to execute local methods and access local attributes.

Upon being informed by the Duplication Manager of a new user terminal that said new user terminal has connected to the network, the Duplication Manager in charge of the Duplicate Master determines whether applications running on said new user terminal require a duplicate and, subsequently, the Duplication Manager of said new user terminal creates a local duplicate and the duplicate master provides the most recent data or object to said duplicate in the main memory of said new user terminal, so that said duplicate can operate in synchronicity with the Duplicate Master.

A Duplicate Master 405 contains generic or application-specific data, which requires sharing over a network in synchronicity with its duplicates. It acts as a coordinator between a shared application and its duplicates, such that changes on the Duplicate Master are propagated to its duplicates, in order to preserve system integrity. As apex coordinator, the Duplicate Master is equipped with a mechanism allowing it to trigger a locally-executed method on all remote duplicates, called an action.

A Duplicate 404 is structured with potentially the same functionality as a Duplicate Master, but initially only maintains information for local data access and performs methods for local processing. As dependent from the Duplicate master, the Duplicate is equipped with a mechanism allowing it to trigger a locally-executed method on the duplicate master, called reversed action. For instance, should a duplicate require a change in the data it contains in answer to an application command, it will trigger a reversed action and obtain updated information from the duplicate master.

Figure 5:
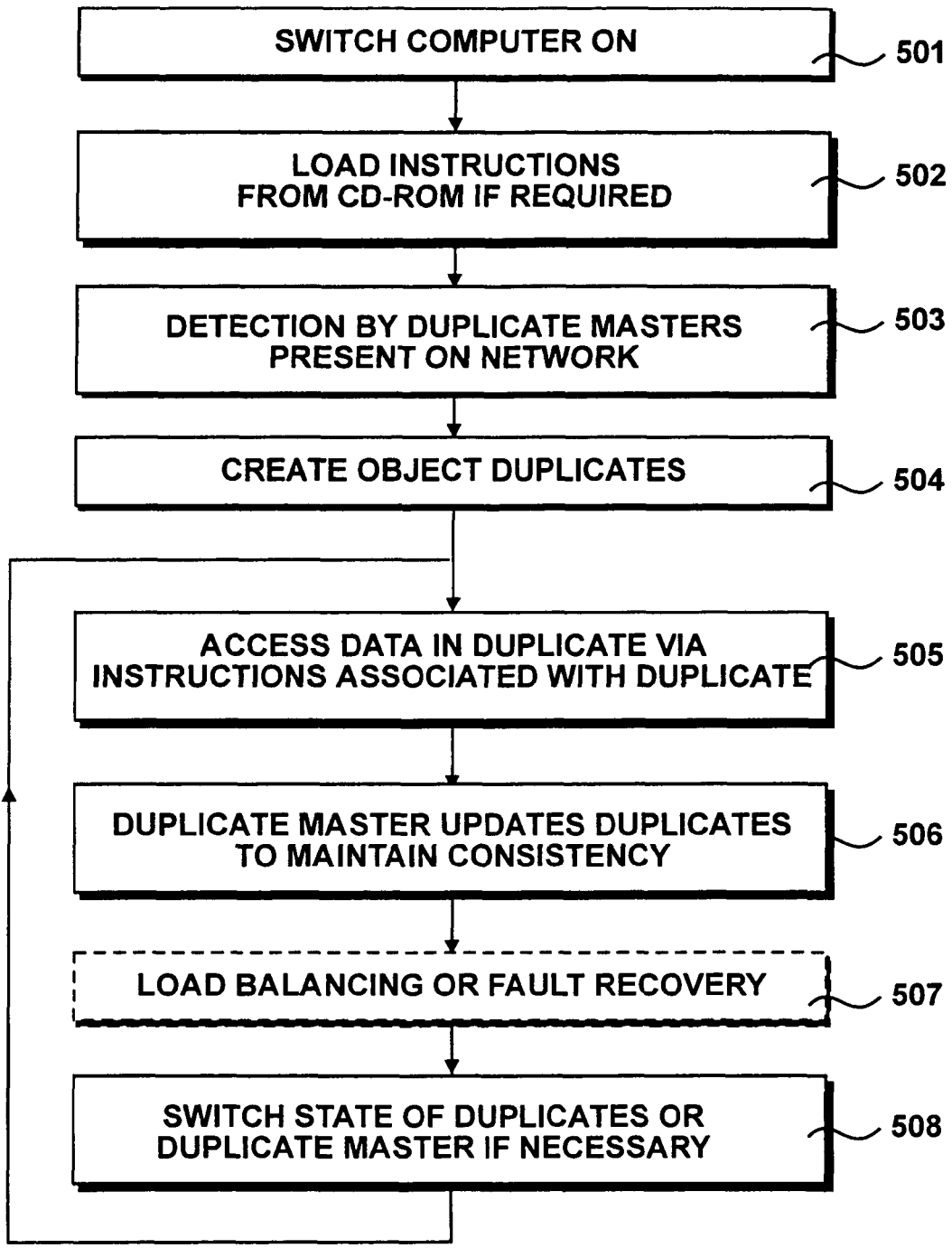
FIG. 5 summarises actions performed at a user terminal when logging onto a network.

The duplication manager 403 shown in the computer's memory in FIG. 4 is detailed in FIG. 5.

Upon activation of a user's terminal at step 501, the instructions necessary for the duplication manager 403 to carry out its local functions may need to be loaded from an external medium, such as a CD ROM, at step 502.

As the user's terminal connects to the network and the duplication manager application is launched locally, it is simultaneously detected by all remote duplication managers currently connected to the same network group as said user terminal at step 503.

A remote duplicate master 405 comprising data and methods then creates a local duplicate in the main memory of the local user terminal from its current set of information available at step 504.

Any local application can now access data in the duplicate locally and process said data locally via the instructions associated with the duplicate at step 505.

The duplicate master 405 ensures that the duplicate 404 is regularly updated in order to achieve and maintain data consistency at step 506.

If the main memory of the user terminal stores the duplicate master 405, as opposed to duplicate 404, the total processing activity load placed upon the CPU may exceed a delimited amount necessary for the fluid operation of the applications, including the duplication manager, stored in its memory. As said fluid operation is graphically represented by the application within the Graphical User Interface by a performance indicator, the user can ascertain whether they need to perform a load balancing instruction at step 507, in order to alleviate said load placed upon said CPU.

In this instance, the duplicate master 405 therefore switches the state of a remote duplicate to the state of a duplicate master, in effect delegating its Master status to said remote duplicate, in order to balance the resource load generated by the duplication manager and duplicate master between the local and remote sets of user terminal CPU resources.

Alternatively, if the main memory of the user terminal stores the duplicate 404, said duplicate 404 becomes the duplicate master 405 transparently, i.e. the user can choose to remain unaware of the state change of the duplicate stored in the main memory of the user terminal they operate.

If the main memory of the user terminal which stores the duplicate master 405 becomes unavailable on the network, i.e. if the keep-alive procedures are breached by loss of connectivity, then the duplication manager performs fault recovery at step 508.

The duplication manager therefore elects only one duplicate to become the Duplicate Master and then switches the state of this remote duplicate to the state of a duplicate master, ensuring that a single duplicate amongst all duplicates present on a network takes over the responsibility of sharing and updating the data.

As at step 507, the user remains unaware of the state change of the duplicate stored in the main memory of the user terminal they operate.

Figure 6:
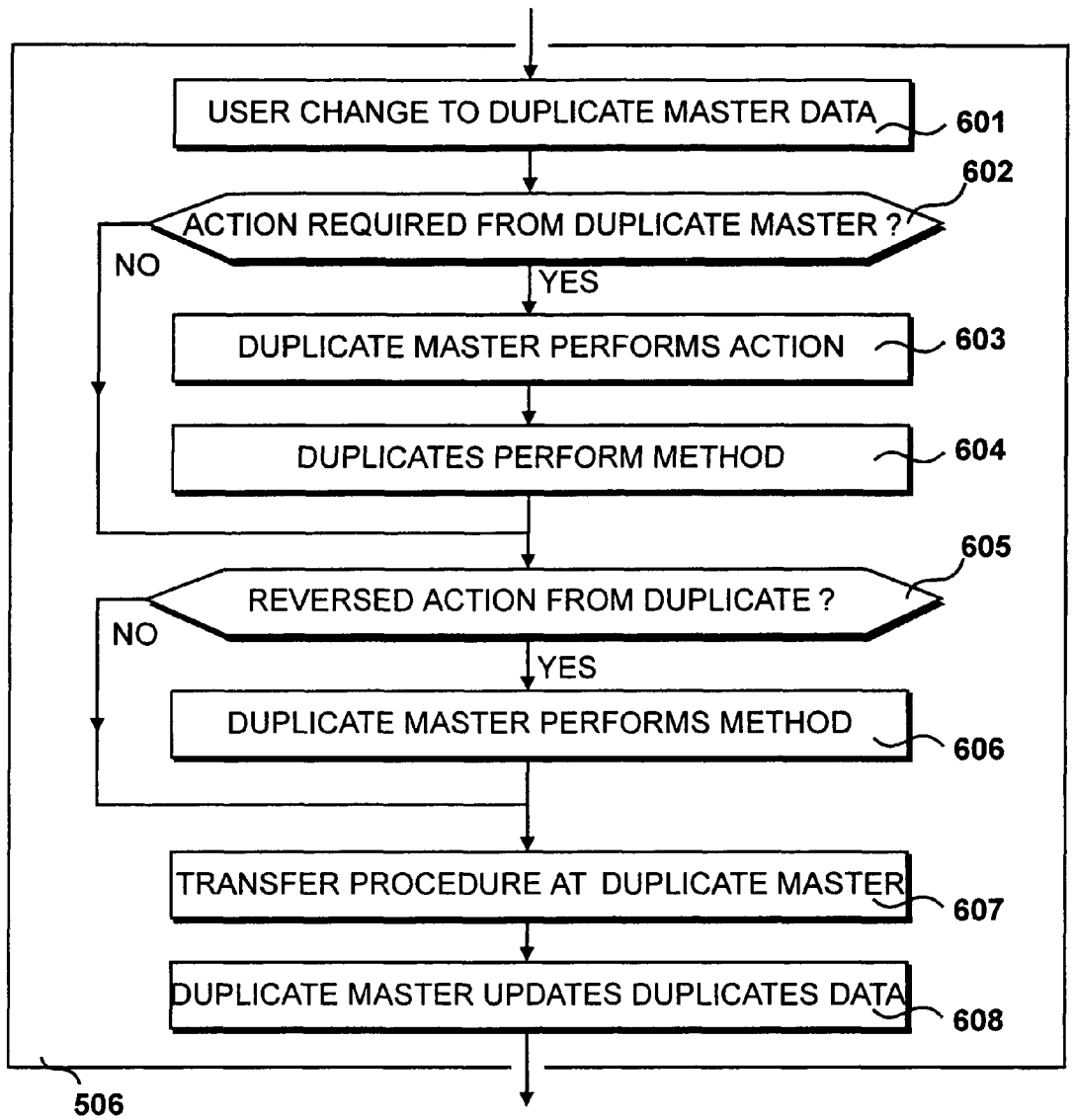
FIG. 6 summarises actions performed when updating duplicated objects to maintain consistency.

An update to maintain data consistency, such as occurring at step 506, is summarised in FIG. 6.

At step 601 the duplicate master 405 ascertains any change to the data based on a user-inputted application command, such as would occur if, in the example, additional diary information needed implementing, such as a new meeting or appointment.

At step 602, the duplicate master 405 ascertains whether the user-inputted application command, which generated the data change at step 601, includes the subsequent requirement of an action to be performed by said duplicate master. If said action is not required, then the procedure moves forward to step 605. Alternatively, should said action be required, the duplicate master 405 performs said action, which translates as the requirement for all duplicates derived from said duplicate master to perform a method.

At step 604, said method is subsequently performed by all the duplicates derived from duplicate master, which are present on a common network group.

At step 605, the duplicate master 405 ascertains whether a duplicate has performed a reversed action. Should said reversed action be issued from a duplicate, then the duplicate master 405 performs the related method at step 606. In the example, said reversed action from said duplicate may take the form of an exclamation mark set against a particular diary entry, in order to outline its importance within a particular set of diary entries. The duplicate master will then implement said exclamation mark in all the diary duplicates it is currently in charge of.

Upon completing the data change validation procedure outlined in steps 601 to 606, the duplicate master 405 then initiates the data update procedure at step 607, i.e. it establishes a simultaneous link to all duplicates it is currently in charge of on a common network group. Upon successfully establishing said procedure the duplicate master 405 can then update all the duplicates at step 608.

Thus, the duplicate master ensures that all duplicates are consistently updated with a common set of data, i.e. an identical set of diary entries.

The duplicate master subsequently establishes data transfer procedures at step 607, in order to successfully update the duplicates at step 608.

Figure 7:
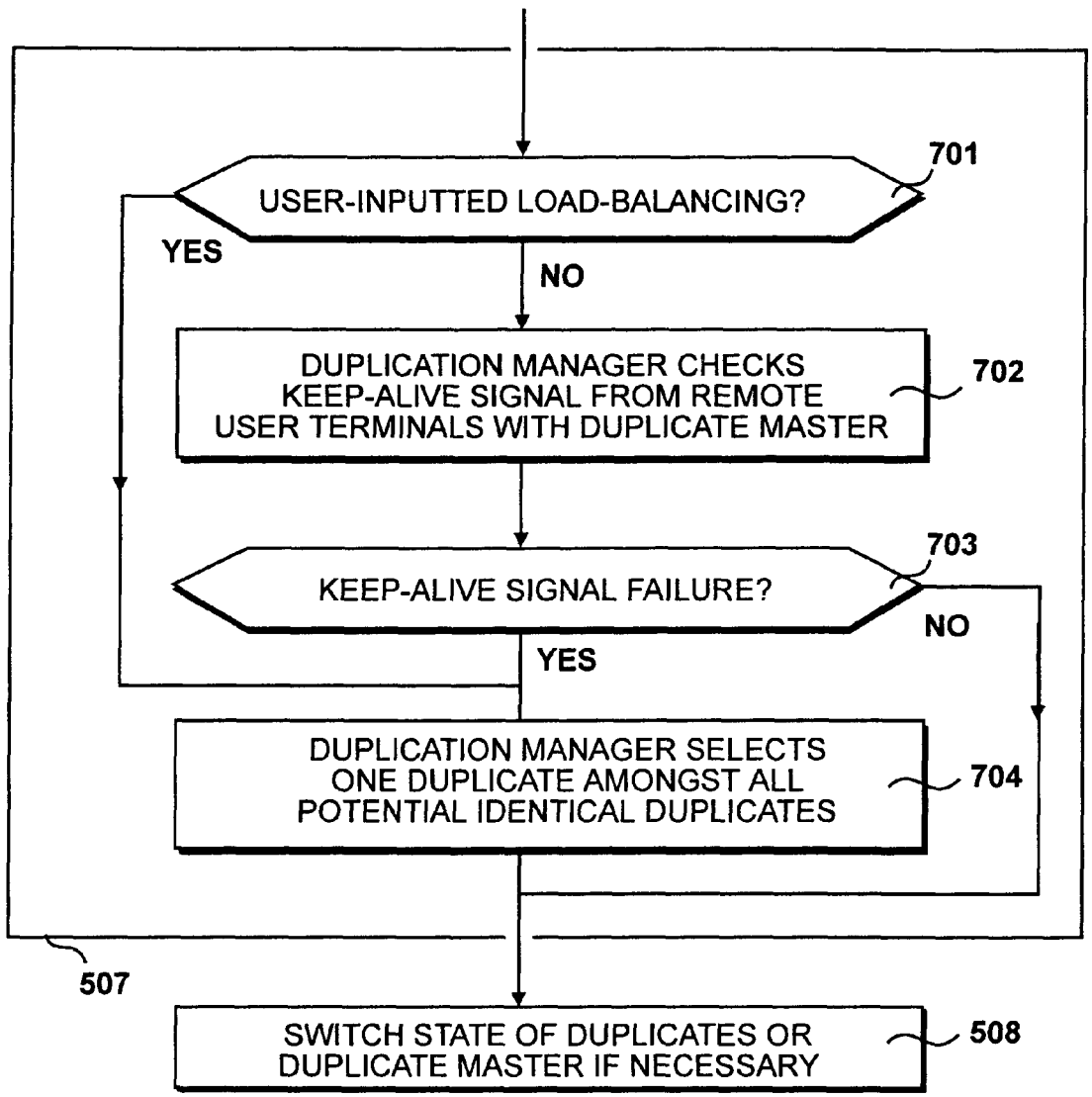
FIG. 7 summarises actions performed to decide whether to switch the state of a duplicate to a state of duplicate master if necessary.

Upon completing the data update procedure illustrated in FIG. 6, a load-balancing task can be performed by the duplication manager 403 and initiated either by the user in case of CPU resource overload or automatically in case of a network fault, where it can be considered as a fault recovery task. Such a load-balancing task is summarised in FIG. 7. When performing a load balancing task, the duplication manager in effect switches the state of a duplicate to the state of a duplicate master if necessary, and subsequently switches the state of the previous duplicate master to the state of a duplicate.

At step 701, the duplication manager 403 first determines if the user has inputted a command to perform load balancing, as he would be prompted to do by the visual representation, by way of a performance indicator, of an overload of the terminal CPU in the Graphical User Interface, in order to alleviate said overload placed upon said CPU. If such a command is received, then the procedure immediately moves forward to step 704.

Alternatively, the duplication manager carries out its next duplicate servicing task. In order for the remote duplicate master 405 to successfully share and update its duplicates, the duplication manager 403 must ensure that there exists connectivity to the duplicate master at each cycle, at step 702.

Should said connectivity be lost and the duplicate master is pronounced unavailable at step 703, then at step 704 the duplication manager 403 will next ascertain which duplicate is the most suitable duplicate to become duplicate master, i.e. the most up-to-date. Should a local duplicate be identified as said most suitable duplicate then the duplication manager will switch the state of said local duplicate to that of duplicate master at step 705. Alternatively, should a remote duplication manager first identify its respective duplicate as said most suitable duplicate at step 704, then said remote duplication manager will inform the local duplication manager that a new duplicate master 405 exists on the network and the remote duplication master will establish synchronicity with the local duplicate.

Figure 8:
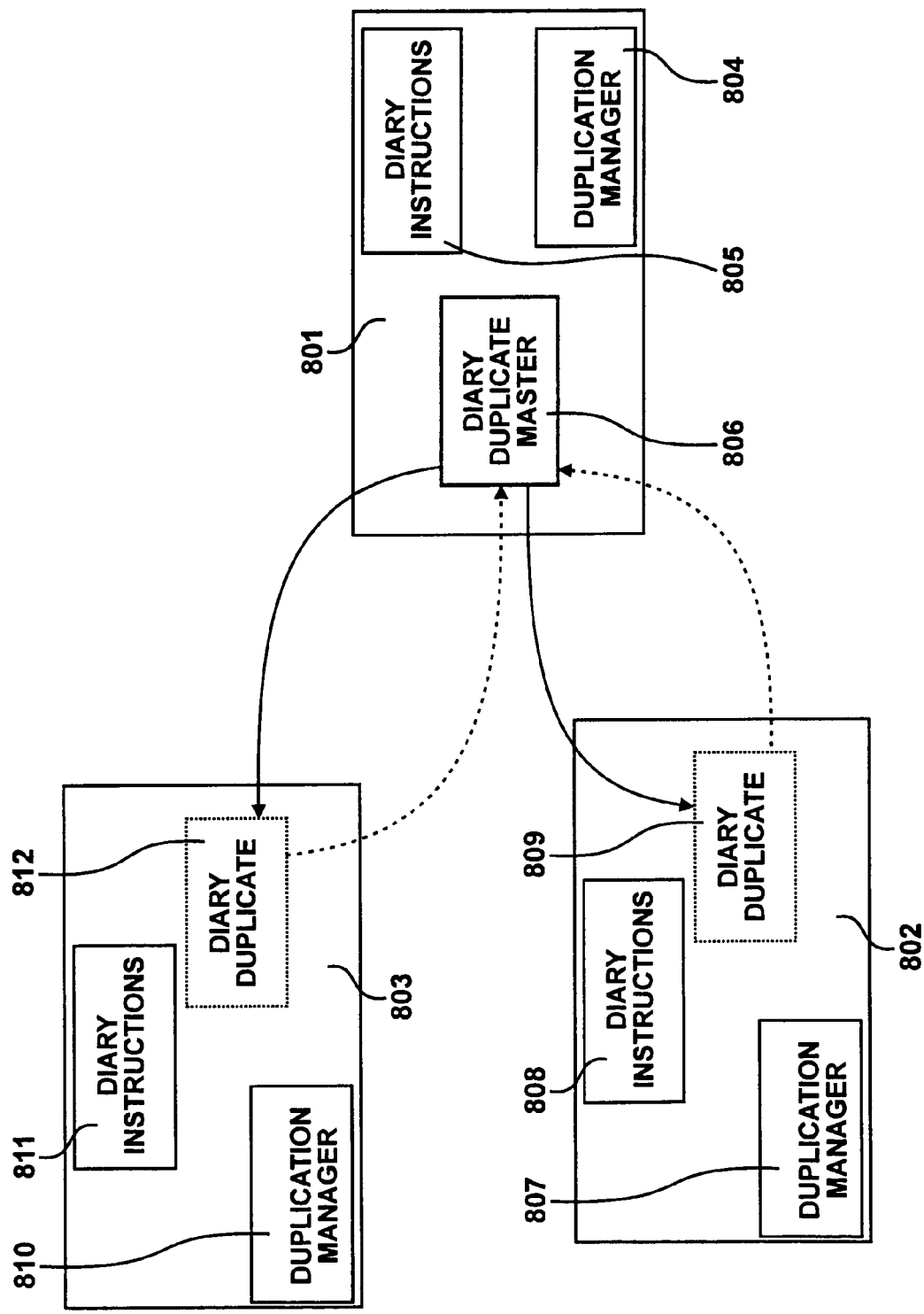
FIG. 8 illustrates interactions between a duplicate master and duplicates respectively located on three individual terminals.

In the example, part of the contents of the main memory of three distinct networked-user terminals connected to a common network group are respectively illustrated in FIG. 8. Main memory 801 stores a duplication manager 804, diary instructions 805 and the diary duplicate master 806. The diary duplicate master comprise diary information. Main memory 802 stores a duplication manager 807, diary instructions 808 and a diary duplicate 809, which shares diary information with diary duplicate master 806. Main memory 803 stores a duplication manager 810, diary instructions 811 and a diary duplicate 812, which also share diary information with diary duplicate master 806. Diary duplicate master 806 forwards diary information updates to both diary duplicates 809, 812.

Figure 9:
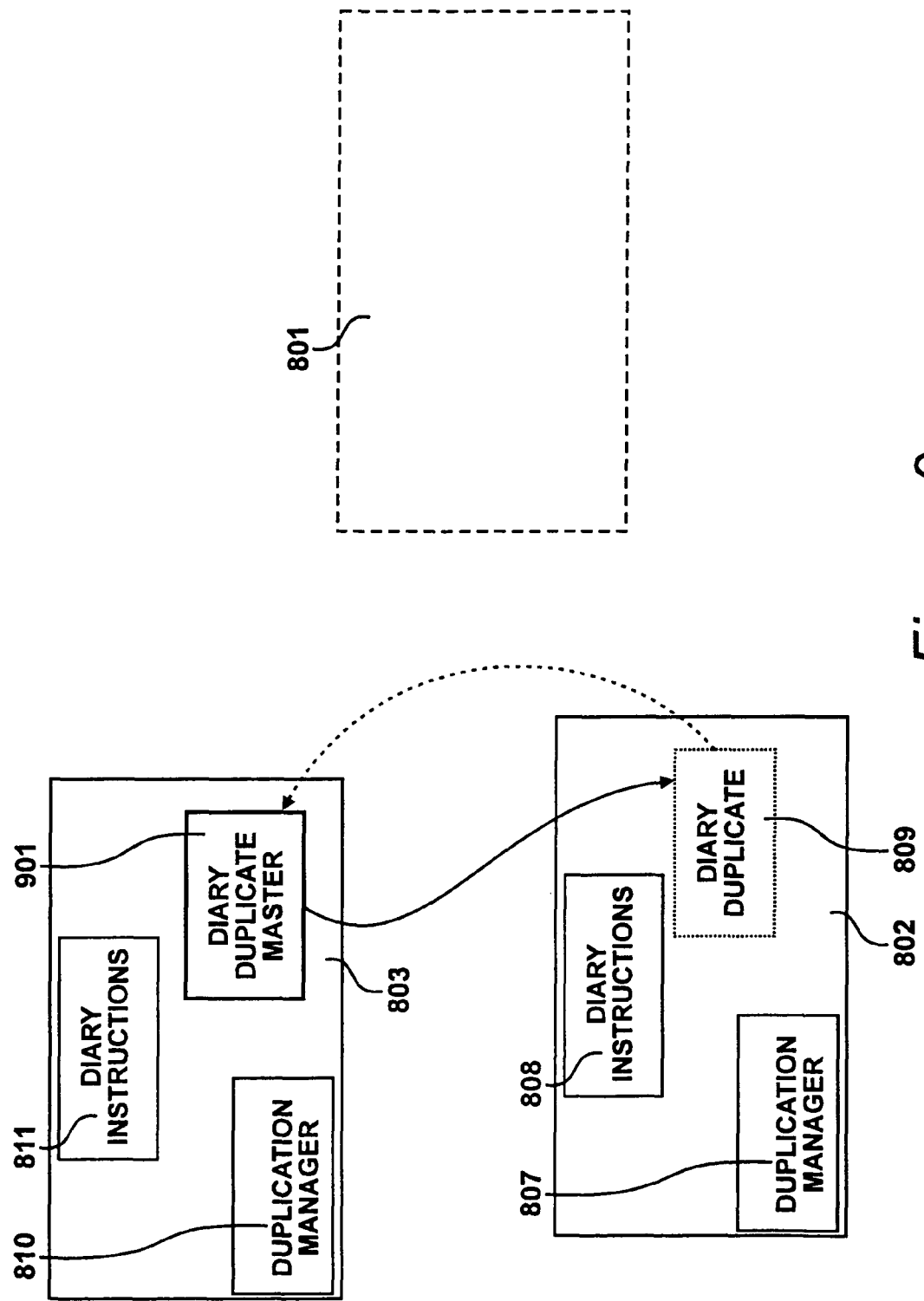
FIG. 9 illustrates the interactions in FIG. 8, wherein a terminal has been disabled and has become unavailable on the network and the state of the duplicate has been switched.

In FIG. 9 however, main memory 801 is now disabled, i.e. not available for sharing data over the network, due to any possible circumstance, such as the user terminal being voluntary or involuntarily switched off, the ISP becoming unavailable or connecting means being faulty. At step 703, duplication managers 807 and 810 have ascertained that the duplicate master is not available anymore and, following step 704, duplication manager 807 determines that duplicate 812 is better suited to become duplicate master than its own duplicate 809. For instance, duplicate 812 was last updated before duplicate 809 by the now defunct duplicate master 806.

Consequently, the state of duplicate master 812 is switched to the state of diary duplicate master 901. Duplication manager 810 and diary instructions 811 remain unchanged. Diary duplicate master 901 now updates the diary information of diary duplicate 809.

Figure 10:
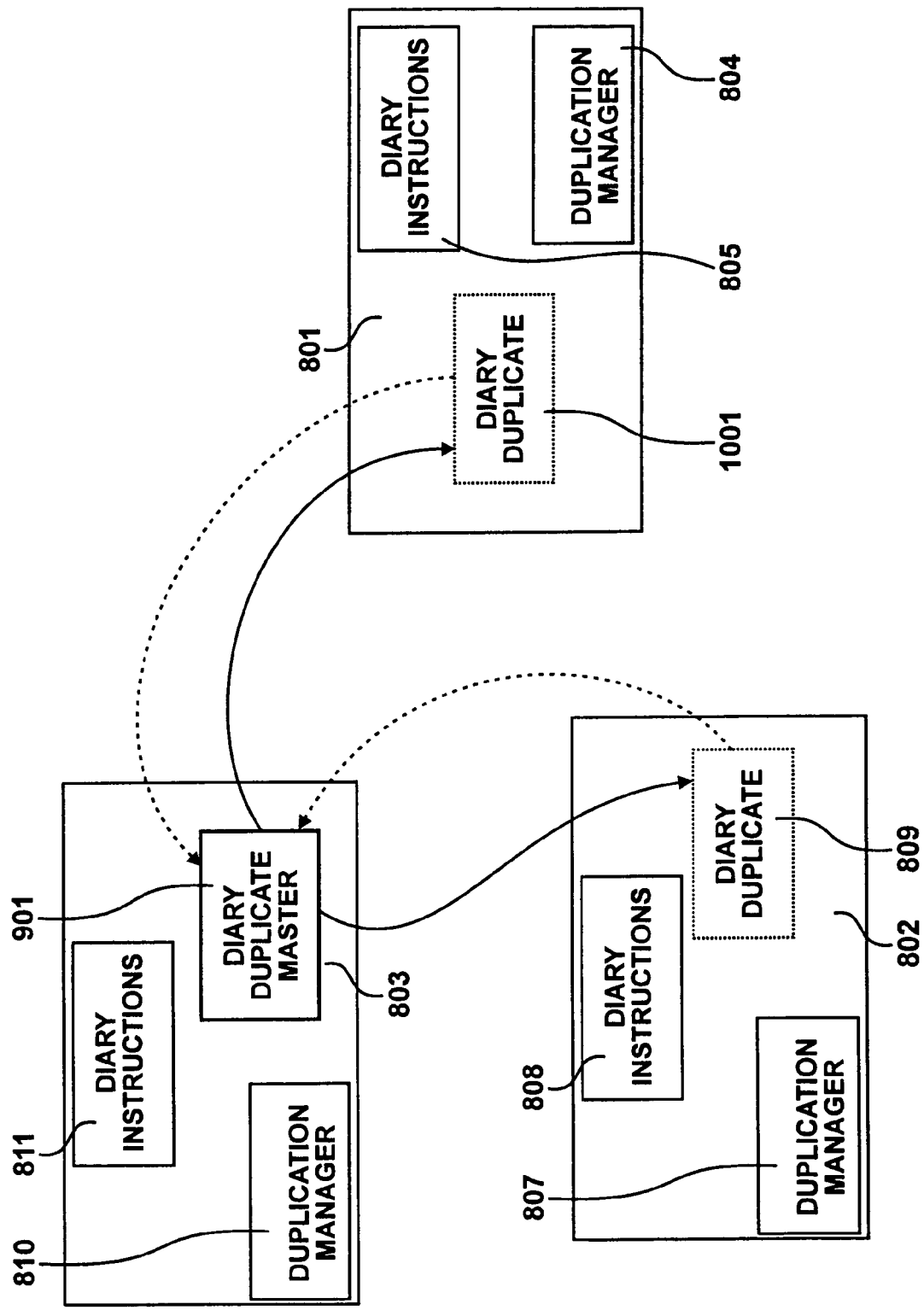
FIG. 10 illustrates the interactions of FIGS. 8 and 9, wherein said disabled terminal is now back on the network, and subsequent duplicate interaction.

In FIG. 10, upon rejoining the network group onto which the respective user terminals corresponding to main memory 802 and main memory 803 are logged to, main memory 801 again stores a duplication manager 804 diary instructions 806 and a diary duplicate 1001. Said diary duplicate 1001 is a duplicate of diary duplicate master 901 and, consequently, diary duplicate 1001 contains all the updates that have taken place between diary duplicate master 901 and diary duplicate 809 that have taken place whilst the user terminal main memory 801 is part of was disconnected from the network. Duplication manager 804, diary instructions 805 and diary duplicate 1001 resume operation in an identical fashion to duplication manager 807, diary instructions 808 and diary duplicate 809 of main memory 802. Diary duplicate master 901 stored in main memory 803 updates both the diary duplicate 809 and 1001 with diary information.

Figure 11:
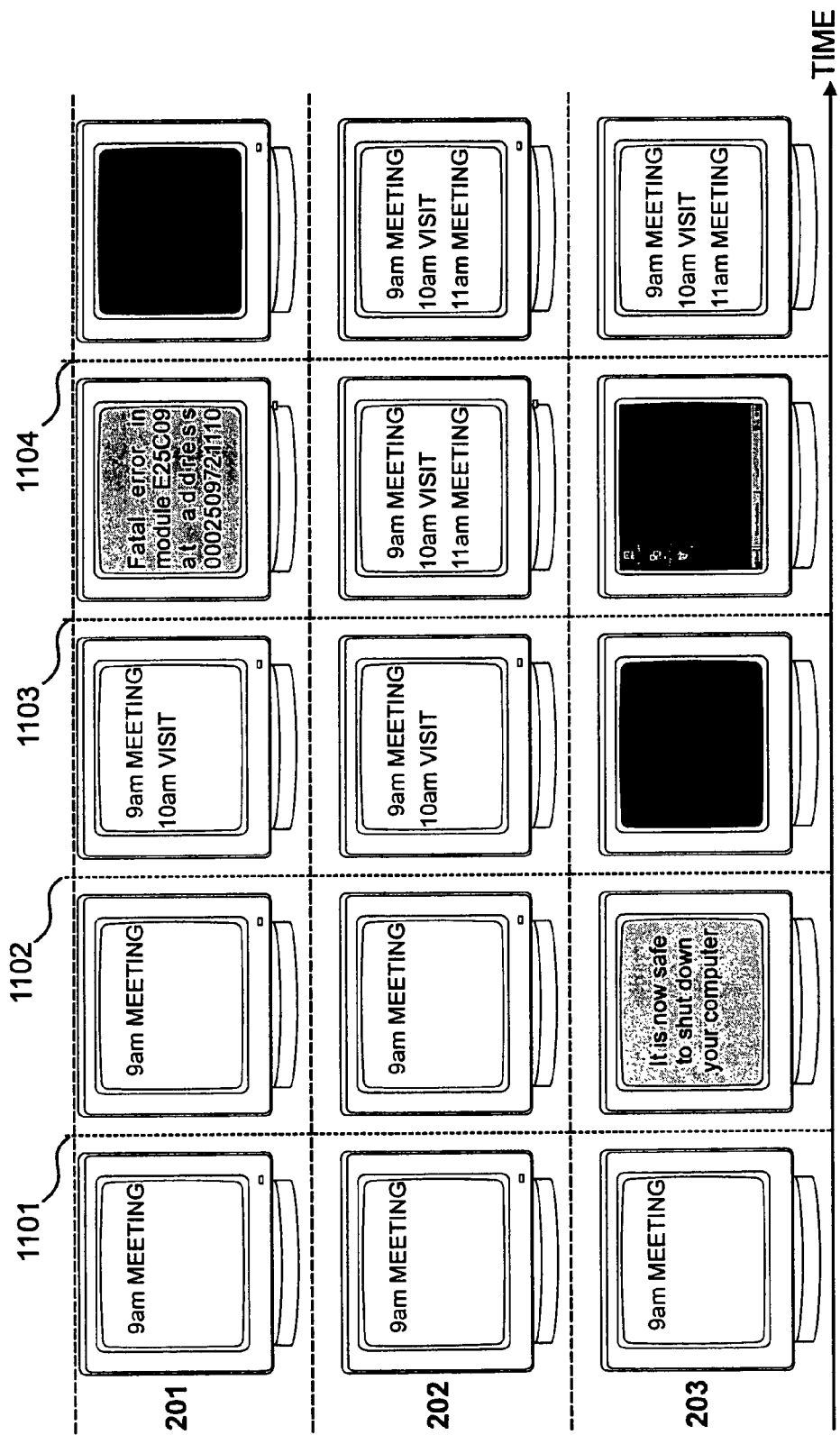
FIG. 11 illustrates the interactions featured in FIGS. 8, 9 and 10 by way of a representation of the respective Graphical User Interface of the three distinct network terminals over a period of time.

FIG. 11 graphically illustrates the above interactions, by way of observing the display means 201, 202 and 203 of user terminals 111, 106 and 110 respectively, over a period of time.

Prior to event 1101, display means 201, 202 and 203 display the graphical user interface of a diary application. For each of display means 201, 202 and 203, part of the main memory of their respective user terminal 111, 106 and 110 each include a duplication manager, diary instructions and a diary duplicate. In the example, the diary duplicate master is part of the main memory associated with display means 203.

At event 1101, the user terminal 110 is conventionally switched off for the purpose of hardware maintenance. The operating system of user terminal 110 is preferably Windows 98. Part of the standard procedure for user terminal shutting according to this known application involves sequentially shutting down all the applications running in the main memory of the user terminal.

Upon closing all applications, a standard message is displayed, which informs the user that they may now switch the user terminal off at the mains. Upon shutting down user terminal 110, the duplication managers respectively stored in the main memory of user terminal 106 and 111 determine that duplicate master is not available anymore, as at step 703. The duplication manager stored in the main memory associated with display means 201 determines that the diary duplicate stored in said main memory is best suited to have its state switched. The diary duplicate stored in the main memory associated with display means 201 therefore becomes the diary duplicate master. Display means 201 and 202 display the same data in their respective graphical user interface.

At event 1102, a new diary entry is inputted in the user terminal 111 associated with display means 201. Accordingly, the duplication manager resident in the main memory associated with display means 202 updates the diary information of diary duplicate stored in said memory. Thus, the user at the user terminal 106 associated with display means 202 is now aware that a visit is scheduled at 10.00 am. However, the user terminal 110 is currently shut down.

At event 1103, a malfunction has occurred at user terminal 111. User terminal 111 preferably uses Windows NT4 as an operating system. A standard procedure of said operating system is to inform the user, in the case of an application corruption, where said corruption occurred in the terminal's main memory before closing the operating system down. In such occurrences, a common procedure is to switch the user's terminal off at the mains. In the example, the duplication manager, diary instructions and diary duplicate master stored in the main memory of the user terminal 111 associated with display means 201 are now unavailable over the network. The duplication manager stored in the main memory of the user terminal 106 associated with display 202 has determined that said diary duplicate master is now unavailable and has subsequently switched the state of its diary duplicate to the state of diary duplicate master, as user terminal 110 has been switched on again and is shown as loading duplication manager application and diary instructions from CD ROM.

At event 1104, said user terminal 110 has completed loading said duplication manager applications and diary instructions and, according to steps 503 and 504, has created a diary duplicate from the diary duplicate master stored in the main memory of user terminal 106 associated with display means 202.

The diary duplicate stored in the main memory of user terminal 110 has been updated with the diary entry which occurred between event 1102 and 1103, whilst said user terminal 110 was switched off. Said diary duplicate has also been updated with the diary entry implemented between event 1103 and 1104, when said user terminal 110 was still only loading instructions from an external medium. The user of user terminal 110 is fully appraised of two new diary entries, which were implemented whilst the user's terminal was not connected to the network.

Should the user of user terminal 111 successfully rejoin the network group that user terminals 106 and 110 are logged onto, the duplication manager stored in the user's main memory will create a diary duplicate from diary duplicate master stored in the main memory of user terminal 106, just as the duplication manager stored in the main memory of user terminal 110 created a diary duplicate of said diary duplicate master. The user of user terminal 111, associated with display means 201, will then be fully appraised of any subsequent diary entries implemented at user terminal 106 or 110.

Whereas a diary application is suitable to illustrate the tasks of maintaining and updating duplicated objects according to the invention, such an application is not traditionally resource-intensive in terms of processing requirements. In order to better illustrate the task of load balancing such as detailed at step 507 in FIG. 5 and steps 701 to 708 in FIG. 7, a game application for recreational use is more appropriate.

Game applications are traditionally very resource-intensive in terms of processing requirements and take full advantage of devices such as graphics card 306, sound card 307 and, in the case of LAN or Internet play, modem 310. Moreover, in the case of game applications where game rules include CPU-controlled opposition, artificial intelligence applications are implemented and stored in the main memory of a user's terminal in order to provide said CPU-controlled opposition with intelligent behaviour. According to the known art, such artificial intelligence applications are traditionally the most resource-intensive applications stored in a user's terminal main memory.

Figure 12:
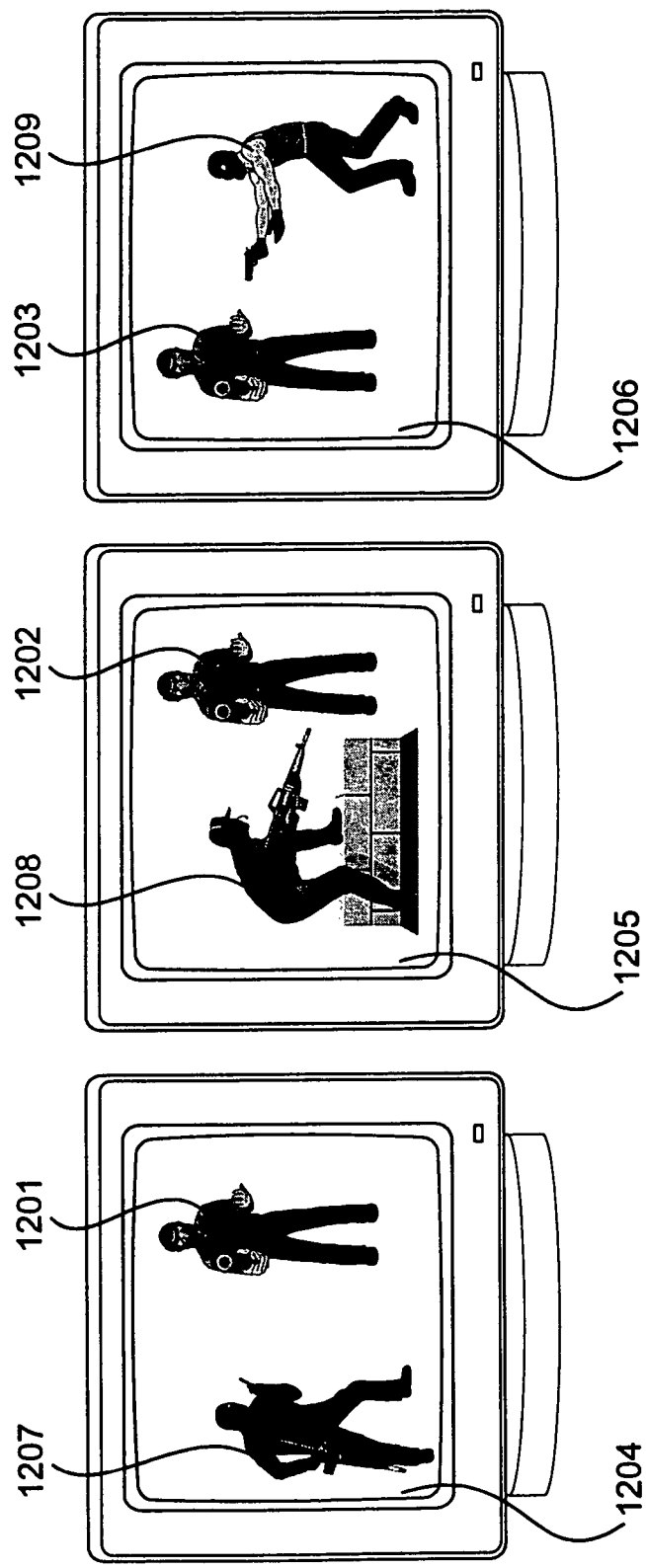
FIG. 12 illustrates the objects visible on the display means of three distinct networked terminals.

Such a game application, including CPU-controlled opponents governed by an artificial intelligence application, is illustrated in FIG. 12. Avatars 1201, 1202 and 1203 represent an identical, single CPU-controlled opponent, which is separately viewed on display means 1204, 1205 and 1206. In the game, which takes place over a network, an avatar 1207 represents the player who operates the user terminal corresponding to display means 1204. Similarly, an avatar 1208 and an avatar 1209 respectively represents the player operating the user terminal corresponding to display means 1205 and the player operating user terminal corresponding to display means 1206. As the avatars 1201, 1202 and 1203 are a representation of a single CPU-generated artificial intelligence object shared over a network by three distinct user terminals, the attributes and data of said artificial intelligence object are duplicated onto the main memory of the respective user terminals of said players, where avatar 1202, i.e. artificial intelligence object 1202, is the duplicate master in the example.

Figure 13:
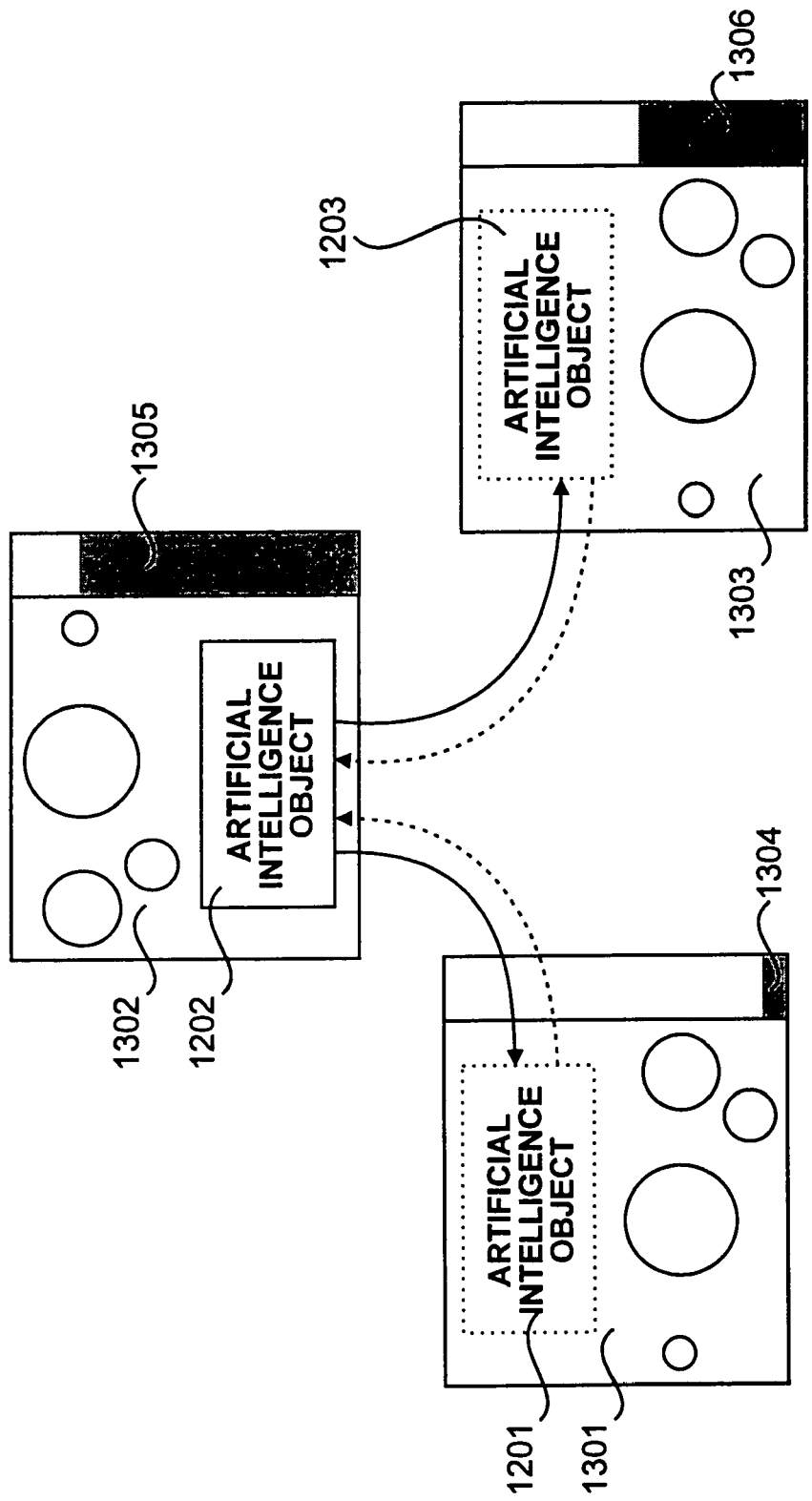
FIG. 13 illustrates the contents of the respective main memory of said three distinct networked terminals.

FIG. 13 provides a graphical representation of the main memory 1301, 1302 and 1303 of the user terminals respectively associated with display means 1204, 1205 and 1206. Each of said main memories 1301, 1302 and 1303 includes an operating system, applications, a duplication manager, game data and duplicated objects 1201, 1202 and 1203 respectively. Artificial intelligence object 1202 is the duplicate master and artificial intelligence objects 1201 and 1203 are duplicates; said duplicate master and duplicates interact according to the sequence of tasks represented in FIGS. 5, 6 and 7.

In addition to the representation of the main memories 1301, 1302 and 1303 of said distinct user terminals, resource load tolerance gauges 1304, 1305 and 1306 graphically represent the resource load placed upon the respective central processing units of said user terminals. As artificial intelligence object 1202 is the duplicate master, it therefore updates and maintains artificial intelligence objects 1201 and 1203.

As the attributes and data processing of said artificial intelligence object are resource-intensive, the resource load tolerance gauge 1305 accordingly illustrates a CPU-usage level of approximately seventy-five percent. Resource load tolerance gauges 1304 and 1306, respectively illustrate a CPU-usage level of approximately ten percent and approximately fifty percent, as artificial intelligence objects 1201 and 1203 are simple duplicates.

Upon being appraised of the resource load placed upon the CPU of the terminal by way of the GUI-displayed graphical representation of gauge 1305, the terminal user instructs the duplication manager stored in main memory 1302 to perform load-balancing between the respective CPUs of user terminals illustrated by main memories 1301, 1302 and 1303.

Upon comparing resource load tolerances, said duplication manager in main memory 1302 has ascertained that the CPU of the terminal corresponding to main memory 1301 is best suited for the switching of the locally-stored artificial intelligence object to the state of duplicate master, with regard to its respective resource load tolerance gauge 1304 indicating only ten percent of CPU-usage level.

Figure 14:
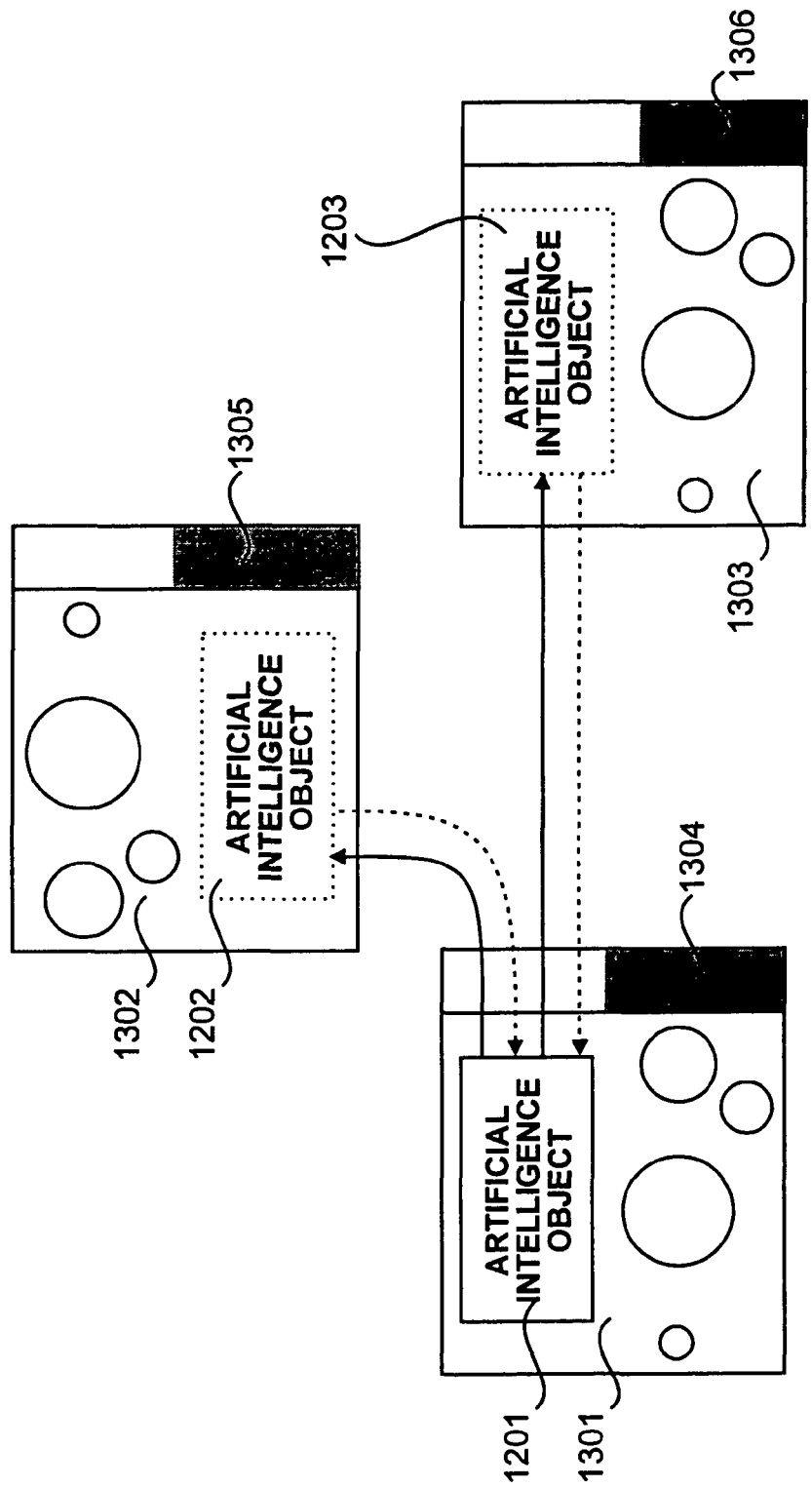
FIG. 14 illustrates load balancing between said three distinct network terminals.

FIG. 14 graphically illustrates the result of the load balancing task performed by said duplication manager resident in main memory 1302. The state of duplicate 1201, i.e. artificial intelligence object 1201, has been switched to the state of duplicate master 1201. The interactions between duplicate master 1201 and duplicates 1202 and 1203 take place in an identical fashion as the interactions which were taking place between duplicate master 1202 and duplicates 1201 and 1203 prior to the state switching. The resource load tolerance gauges 1304, 1305 and 1306 now illustrates a CPU-usage level of approximately fifty percent respectively. Thus, a load balancing operation has been performed, which preserves the performance and integrity of the applications both locally and remotely.

What we claim is:

1. Apparatus for sharing data over a network having a plurality of network-connected terminals, each terminal comprising
    a visual display;
    a processor;
    storage; and
    memory;
    wherein said memory in each terminal includes:
    a first data object that contains data and dynamic elements comprising attributes and methods, said first data object being duplicated to each of said other network connected terminals, and a plurality of second data objects, each of which contains data and dynamic elements comprising attributes and methods, each of which second data objects is a duplicate of a data object on another terminal, such that there exists within the network a plurality of sets of duplicated data objects; and
    computer program instructions for normal operations comprising:
    maintaining an environment for a networked game and displaying said environment on said visual display;
    for at least one of said data objects in said memory, generating an entity using said methods and attributes in said data object and displaying it in said environment according to said data in said data object;
    periodically providing over said network an update of the data contained in said first data object;
    updating the data contained in said second objects in response to receiving updates over said network, wherein for each of said updates a portion of the data in one of said second objects is replaced with data contained in the update without changing the dynamic elements in said second object; and for each set of duplicated data objects;

establishing one of said data objects as a master data object, wherein said master data object is responsible for maintaining consistency between the data in the data objects in said set, and when the terminal that maintains said master data object becomes unavailable, determining which of said data objects in the set should be master data object and establishing said data object as master data object.

2. Apparatus according to claim 1, wherein said instructions to maintain data consistency between duplicated objects monitor CPU usage and network bandwidth utilization.

3. Apparatus according to claim 2, wherein a terminal becomes unavailable when its CPU usage exceeds a threshold.

4. Apparatus according to claim 2, wherein a terminal becomes unavailable when its bandwidth utilization exceeds a threshold.

5. Apparatus according to claim 1, wherein a terminal becomes unavailable when it is switched off.

6. Apparatus according to claim 1, wherein a terminal becomes unavailable when its connection to the network is lost.

7. A method of accessing data over a network of terminals, wherein each of said terminals:

maintains a first data object that contains data and dynamic elements comprising attributes and methods, said first data object being duplicated over the network to each of said other terminals, and a plurality of second data objects, each of which contains data and dynamic elements comprising attributes and methods, and each of which second data objects is a duplicate of a data object on another terminal, such that there exists within the network a plurality of sets of duplicated data objects, maintains an environment for a networked game and displays it on said visual display, for at least one of said data objects in said memory, generates an entity using said methods and attributes in said data object and displays it in said environment according to said data in said data object, periodically provides over said network an update of the data contained in said first data object, and updates the data contained in said second objects in response to receiving updates over said network, wherein for each of said updates a portion of the data in one of said second objects is replaced with data contained in the update without changing the dynamic elements in said second object; said method comprising:

for each set of duplicated data objects:

establishing one of said data objects as a master data object, wherein said master data object maintains consistency between the data in the data objects in said set; and when the terminal that maintains said master data object becomes unavailable, determining which of said data objects in the set should be master data object and establishing said data object as master data object.

8. A method according to claim 7, wherein each of said terminals monitors its own CPU usage and network bandwidth utilization.

9. Presented) A method according to claim 8, wherein a terminal becomes unavailable when its CPU usage exceeds a threshold.

10. A method according to claim 8, wherein a terminal becomes unavailable when its bandwidth utilization exceeds a threshold.

11. A method according to claim 7, wherein a terminal becomes unavailable when it is switched off.

12. A method according to claim 7, wherein a terminal becomes unavailable when its connection to the network is lost.

13. A terminal for sharing data over a network having a plurality of network-connected terminals, comprising a visual display;
a processor;
storage; and
memory;

wherein said memory includes:

a first data object that contains data and dynamic elements comprising attributes and methods, said first data object being duplicated to each of said other network connected terminals, and a plurality of second data objects, each of which contains data and dynamic elements comprising attributes and methods, and each of which second data objects is a duplicate of a data object on another terminal, such that there exists within the network a plurality of sets of duplicated data objects; and computer program instructions for normal operations comprising:

maintaining an environment for a networked game and displaying said environment on said visual display;

for at least one of said data objects in said memory, generating an entity using said methods and attributes in said data object and displaying it in said environment according to said data in said data object;

periodically providing over said network an update of the data contained in said first data object;

updating the data contained in said second objects in response to receiving updates over said network, wherein for each of said updates a portion of the data in one of said second objects is replaced with data contained in the update without changing the dynamic elements in said second object; and for each set of duplicated data objects:

storing information as to which of said data objects is a master data object that is responsible for maintaining consistency between the data in the data objects in said set, wherein any of said duplicated data objects in the set may be a master data object, and when the terminal that maintains said master data object becomes unavailable, determining which of said data objects in the set should be master data object and establishing said data object as master data object.

14. A non-transitory computer-readable storage medium having computer-readable instructions executable by a computer during normal ongoing operations such that, when executing said instructions, a computer will:

maintain a first data object in memory that is duplicated to computers connected over a network, and maintain a plurality of second data objects in memory, each of which is a duplicate of a data object on another terminal, such that there exists within the network a set of duplicated data objects, each of said data objects containing data and dynamic elements comprising attributes and methods;

maintain an environment for a networked game and displays it on said visual display, for at least one of said data objects in said memory, generate an entity using said methods and attributes in said data object and displays it in said environment according to said data in said data object, periodically provide over said network an update of the data contained in said data object;

update the data contained in said second objects in response to receiving updates over said network, wherein for each of said updates a portion of the data in one of said second objects is replaced with data contained in the update without changing the dynamic elements in said second object; and for each set of duplicated data objects:

store information as to which of said data objects is a master data object that is responsible for maintaining consistency between the data in the data objects in said set, wherein any of said duplicated data objects in the set may be a master data object, and when the terminal that maintains said master data object becomes unavailable, determine which of said data objects in the set should be master data object and establish said data object as master data object wherein at least one of the master data objects is maintained by a different terminal from that maintaining at least one of the other master data objects.

15. A non-transitory computer-readable storage medium according to claim 14, wherein the role of master data object is transferred to a different computer when the computer that maintains said master data object becomes unavailable.

16. A non-transitory computer-readable storage medium according to claim 14, wherein each of said computers monitors its own CPU usage and network bandwidth utilization.

17. A non-transitory computer-readable storage medium according to claim 16, wherein a computer becomes unavailable when its CPU usage exceeds a threshold.

18. A non-transitory computer-readable storage medium according to claim 16, wherein a computer becomes unavailable when its bandwidth utilization exceeds a threshold.

19. A non-transitory computer-readable storage medium according to claim 15, wherein a computer becomes unavailable when it is switched off.

20. A non-transitory computer-readable storage medium according to claim 15, wherein a computer becomes unavailable when its connection to the network is lost.

* * * * *

UNITED STATES PATENT AND TRADEMARK OFFICE
CERTIFICATE OF CORRECTION

PATENT NO. : 7,801,966 B2 Page 1 of 1
APPLICATION NO. : 09/735925
DATED : September 21, 2010
INVENTOR(S) : Dionne et al.

It is certified that error appears in the above-identified patent and that said Letters Patent is hereby corrected as shown below:

Claim 9, line 1 (col. 11, line 65): delete "Presented)"

Signed and Sealed this

Twenty-first Day of December, 2010

David J. Kappos
*Director of the United States Patent and Trademark Office*